United States Patent [19]

Pursell

[11] Patent Number: 4,733,809
[45] Date of Patent: Mar. 29, 1988

[54] REMOVABLE SKI RACK FOR MOTOR VEHICLES

[76] Inventor: Mark S. Pursell, 302 New Jersey Ave., Phillipsburg, N.J. 08865

[21] Appl. No.: 888,720

[22] Filed: Jul. 24, 1986

[51] Int. Cl.⁴ .................................................. B60R 9/00
[52] U.S. Cl. ................................. 224/329; 224/319; 224/324; 224/901; 224/917
[58] Field of Search ............... 224/901, 318, 917, 324, 224/319, 323, 322, 314, 315, 328, 329

[56] References Cited

U.S. PATENT DOCUMENTS

| | | |
|---|---|---|
| 2,983,413 | 5/1961 | Verwers ........................ 224/318 |
| 2,988,253 | 6/1961 | Menghi ......................... 224/318 |
| 3,848,785 | 11/1974 | Bott . |
| 3,897,895 | 8/1975 | Read ............................. 224/917 X |
| 3,994,048 | 11/1976 | Rosenthal . |
| 4,048,700 | 9/1977 | Browne . |
| 4,120,437 | 10/1978 | Hara . |
| 4,230,248 | 10/1980 | Finnegan ...................... 224/323 |
| 4,278,192 | 7/1981 | Sazegar ........................ 224/917 X |
| 4,361,347 | 11/1982 | MacIntyre .................... 224/917 X |
| 4,372,470 | 2/1983 | Dallaire ....................... 224/917 X |
| 4,396,138 | 8/1983 | Kirschner . |
| 4,438,878 | 3/1984 | Heslop . |
| 4,456,284 | 6/1984 | Saka . |
| 4,469,260 | 9/1984 | Delahanty . |
| 4,470,528 | 9/1984 | Dyess . |

Primary Examiner—Henry J. Recla
Assistant Examiner—Robert M. Petrik
Attorney, Agent, or Firm—Kenneth P. Glynn

[57] ABSTRACT

The present invention involves a removable ski rack for motor vehicles which includes a pair of vehicle mounting devices and a pair of ski holder devices along with a plurality of ski holders. The pair of vehicle mounting devices each includes a first strap which is long enough to cross over the width of a motor vehicle roof with roof fasteners attached to each end of that strap so that both ends can be secured to the vehicle. In addition, this first strap has a first set of VELCRO ®-type filamentary fastening members located on at least a portion of its top. The pair of ski holder mounting devices each includes a second strap which has a second and opposite set of the VELCRO ®-type filamentary type fastening members located on at least a portion of the bottom and situated so as to correspond to the VELCRO ®-type filamentary fastening members that are located on the top of the first strap. The plurality of ski holders are located on the top of each of the ski holder mounting devices and include ski locking mechanisms so as to detachably lock skis into the ski holders.

18 Claims, 13 Drawing Figures

REMOVABLE SKI RACK FOR MOTOR VEHICLES

BACKGROUND OF THE INVENTION

1. Field of the Invention

This invention relates to a removable ski rack for motor vehicles and more particularly to ski rack which enables the user to maintain a pair of first straps in the mounted position on the roof of a motor vehicle while being able to easily attach and detach a second strap onto the first strap. The second strap which is readily removable contains a plurality of ski holders attached thereto. Thus, the present invention device enables one to remove ski holders and second strap from the roof to lock them in the trunk or inside the car to avoid theft and/or to otherwise protect the ski holders.

2. Prior Art Statement

Prior Art ski carriers have been designed which secure skis to a ski racket or bracket device which is mounted on the roof of a vehicle. Such ski racks generally are either semipermanent in nature, i.e., they require a substantial amount of mechanical work and, very often, tools, to be mounted or removed from the roof of the motor vehicle and are relatively heavy and expensive to manufacture.

U.S. Pat. No. 4,396,138 issued to H. William Kirschner, describes a carrying rack for skis which includes a cord type of base which runs through a series of bolsters which are adapted to hold skis. This device is attached to the vehicle by clamping devices and is removable. However, unlike the device of the present invention, it must be reclamped each time it is put back onto the roof of the auto or other vehicle and all of the bolsters which receive the skis must be uprighted and aligned properly. In addition, this device does not afford the type of strength that may be achieved with the present invention and it does not allow for quick removal of the device as well as quick reattachment of the device.

U.S. Pat. Nos. 4,469,260; 4,438,878; 4,048,700 and 3,848,785 issued to Delahanty, Heslop, Browne and Bott respectively, appear to represent the state of the art in ski racks. These variously show different types of attachment/detachment mechanisms and ski supporting devices. Of these, U.S. Pat. No. 3,848,785 shows a device which is removable in part from a base support number but, unlike the present invention, requires force of a different nature and the use of tools, e.g. a screwdriver. Additionally, the device which is removed from the base appears to be considerably heavy and of a solid rather than flexible or semiflexible structure.

U.S. Pat. Nos. 4,470,528; 4,456,284; 4,120,437 and 3,994,048 issued respectively to Dyess, Saka, Hara and Rosenthal all teach various carrying devices for transporting skis and/or ski poles wherein the skis are bound by use of Velcro ®-type fasteners. The present invention involves a removable ski rack for motor vehicles which includes a pair of vehicle mounting devices and a pair of ski holder devices along with a plurality of ski holders. The pair of vehicle mounting devices each includes a first strap which is long enough to cross over the width of a motor vehicle roof with roof fasteners attached to each end of that stap so that both ends can be secured to the vehicle. In addition, this first strap has a first set of VELCRO ®-type filamentary fastening members located on at least a portion of its top. The pair of ski holder mounting devices each includes a second strap which has a second and opposite set of the VELCRO ®-type filamentary type fastening members located on at least a portion of the bottom and situated so as to correspond to the VELCRO ®-type filamentary fastening members that are located on the top of the first strap. The plurality of ski holders are located on the top of each of the ski holder mounting devices and include ski locking mechanisms so as to detachably lock skis into the ski holders. VELCRO ® is a registered trademark of VELCRO Corp., New York, N.Y. However, none of these show the configuration or specific arrangement described or claimed in the present invention with respect to the fastening of the skis and/or poles to the ski rack of the present invention and none of these references teach or suggest the use of Velcro ® for physically attaching a ski rack to a strap on the roof of a motor vehicle.

SUMMARY OF THE INVENTION

The present invention involves a removable ski rack for motor vehicles which includes a pair of vehicle mounting means and a pair of ski holder means along with a plurality of ski holders. The pair of vehicle mounting means each includes a first strap which is long enough to cross over the width of a motor vehicle roof with roof fasteners attached to each end of that strap so that both ends can be secured to the vehicle. In addition, this first strap has a first set of VELCRO ®-type filamentary fastening members located on at least a portion of its top. The pair of ski holder mounting means each includes a second strap which has a second and opposite set of the Velcro ®-type filamentary fastening members located on at least a portion of the bottom and situated so as to correspond to the Velcro ® filamentary fastening members that are located on the top of the first strap. The plurality of ski holders are located on the top of each of the ski holder mounting means and include ski locking mechanisms so as to detachably lock skis into the ski holders.

BRIEF DESCRIPTION OF THE DRAWINGS

The present invention will be more fully understood in light of the specification and drawings, wherein.

DETAILED DESCRIPTION OF THE PRESENT INVENTION

Figure 1:
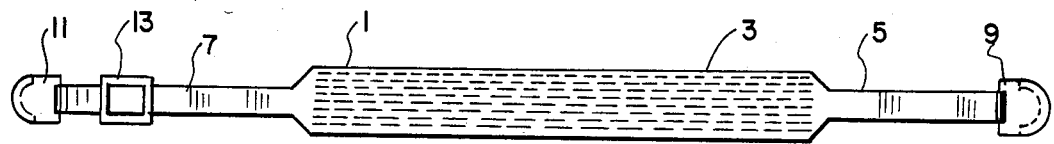
FIG. 1 represents one preferred embodiment of the present invention vehicle mounting means, top view, which is an element of the removable ski rack.

FIG. 1 shows a top view of one preferred embodiment of a vehicle mounting means used in the removable ski rack of the present invention. In FIG. 1, the vehicle mounting means is shown generally as 1 and consists of a first strap 3 which is of adequate length to substantially traverse the width of a motor vehicle and includes roof fasteners 5 and 7 which include clamps 9 and 11 respectively. Optional adjustment means 13 is also shown. The adjustment means 13, i.e. length shortening means, is used so as to enable the tightening of the strap atop a motor vehicle roof. Thus, a pair of vehicle mounting means 1 is placed on the roof of a motor vehicle and clamps 9 and 11 are attached to either the roof gutters or door opening overhangs or windows of the vehicle and adjustment means 13 is used to tighten the vehicle mounting means.

Figure 2:
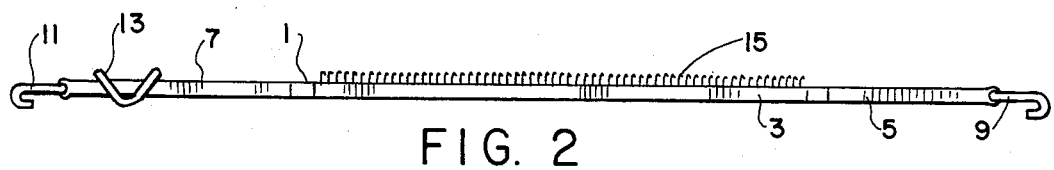
FIG. 2 is a side view of the vehicle mounting means shown in FIG. 1.

FIG. 2 shows a side view of the device of FIG. 1 wherein like parts are like numbered. FIG. 2 shows exaggerated detail of male-hook type filamentary fastening members which is a first set of the VELCRO ®-type filamentary fastening members. When the vehicle mounting means has male-hook VELCRO ® elements then the ski holder mounting means, described in conjunction with FIGS. 3 through 5 below, will have the female-loop type filamentary fastening members, and vice versa. In FIG. 2, male-hook type filamentary fastening member 15 is exemplary.

The clamps 9 and 11 shown in FIGS. 1 and 2 may be of any conventional type of clamp which will enable the vehicle mounting means to be hooked onto or under gutters or, for vehicles without gutters, under the overhanging part of the door roof, or even over the tops of windows. Thus, these clamps may be coated metal or plastic and, if metal, should preferably be plastic coated to prevent marring or scratching of the vehicle finish. The clamps could alternatively be made of very hard rubberized material. The optional length shortening means 13 could be a plastic spring-loaded slider type buckle with teeth such as is known in the fastening art. Additionally, the clamps in conjunction with their roof fastening sections 5 and 7 could have one or more spring-loaded buckle-type attachments for adjustment and/or quick release.

Figure 3:
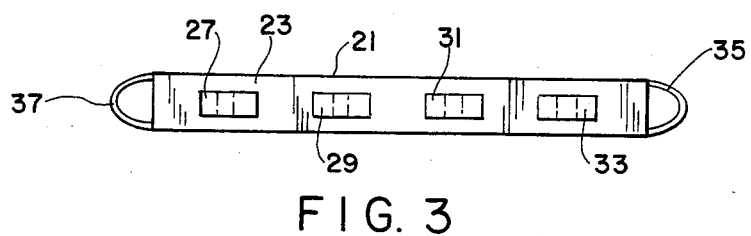
FIG. 3 is a top view of one preferred embodiment ski holder mounting means of the present invention.
Figure 4:
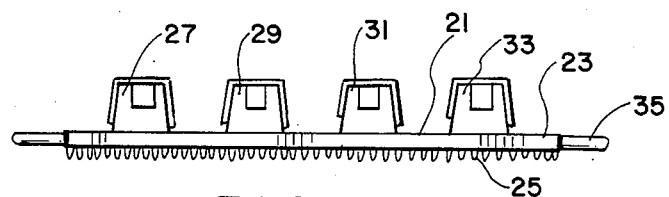
FIG. 4 is a side view of the ski holder mounting means shown in FIG. 3.

FIG. 3 shows a top view of a ski holder mounting means of one preferred embodiment of the present invention. A pair of the ski holder mounting means, shown generally as 21, are removably attached to the vehicle mounting means such as those shown in FIGS. 1 and 2. Ski holder mounting means 21 includes a second strap 23 which has a second set of VELCRO ®-type filamentary fastening members which are of the opposite gender of the filamentary fastening members which are located on the vehicle mounting means. In this case, vehicle mounting means 1 has male-hook type filamentary fastening members as exemplified by filamentary fastening member 15 shown in FIG. 2. Therefore, as shown in FIG. 4, ski holder mounting means 21 has female-loop type filamentary fastening members as is exemplified by filamentary fastening member 25. Ski holder mounting means 21 also includes a plurality of ski holders located on the top side and these are shown as ski holders 27, 29, 31 and 33. Also, optional handles 35 and 37 are also shown to facilitate attachment and removal of ski holder mounting means 21.

Figure 5:
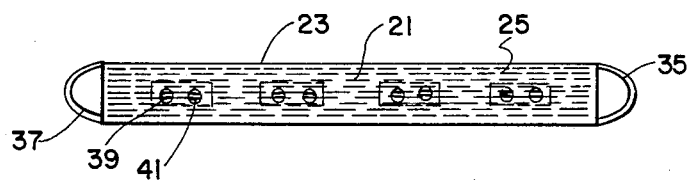
FIG. 5 is a bottom view of the ski holder mounting means shown in FIG. 3.

FIG. 5 shows a bottom view of the ski holder mounting means 21 and merely illustrates that ski holders 27, 29, 31 and 33 could be attached by screws as exemplified by screws 39 and 41. Preferably, the screws would be located within the strap 23 so as to not damage or mar the finish of the vehicle.

Figure 6:
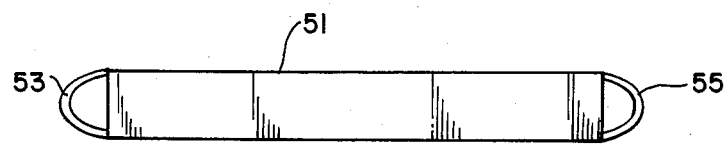
FIG. 6 is a top view of an optional protector to be used in conjunction with the vehicle mounting means such as that shown in FIG. 1 at times when the ski holder mounting means shown in FIGS. 3, 4 and 5 is not in use.
Figure 7:
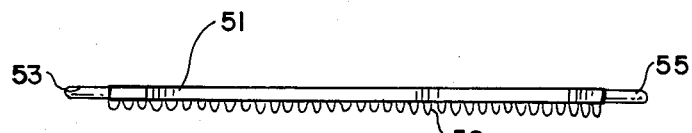
FIG. 7 is a side view of the protector shown in FIG. 6.

FIG. 6 shows a top view and FIG. 7 shows a side view of a protector 51 which may be used to cover vehicle mounting means 1 when ski holder mounting means 21 is not attached thereto. Basically, the protector 51 is very much like the ski holder mounting means 21 but does not include a plurality of ski holders. It includes optional handles 53 and 55, as shown, and contains filamentary fastening members as exemplified by female-loop type filamentary fastening member 59. The filamentary fastening members may be either female-loop or male-hook type but should be the same as the filamentary fastening members attached to the bottom of its corresponding ski holder mounting means.

The vehicle mounting means 1 and the ski holder mounting means 21, as indicated, include first strap and second strap elements which basically make up the primary structural aspects of the vehicle mounting means and the ski holder mounting means, respectively. These straps may be flexible plastic, may be synthetic woven or nonwoven material, may be cloth, may be leather, or may be plastic coated flexible metal wiring or any other arrangement of materials that would both allow for adequate flexibility to enable the device to be laid upon the top of a vehicle in such a manner that it rests on the form of the roof, i.e. that it takes on the shape of the roof, yet has adequate strength to assure that it would not easily break apart during use and to assure that it has adequate strength to support ski holders and the weight of skis along with ski poles. Thus, the actual choice of material is a matter of design and is not critical to the invention as long as the requisite flexibility and strength are obtained. Preferably woven nylon fabric such as that used in the seat belt material, or the like, may be used.

Figure 8:
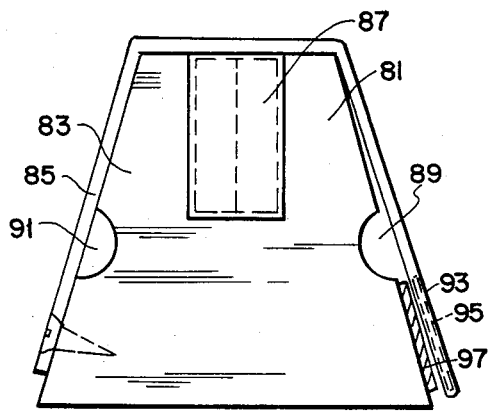
FIG. 8 is a side view of one type of ski holder which may be used in conjunction with the ski holder mounting means such as that shown in FIG. 4.
Figure 9:
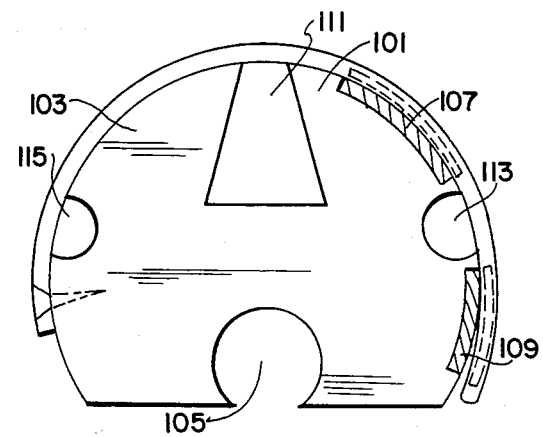
FIG. 9 is a side view of another type of ski holder which may be used in conjunction with the ski holder mounting means of the present invention.

FIG. 8 illustrates one type of ski holder and FIG. 9 illustrates another type of ski holder which may be used in the present invention. FIG. 8 shows ski holder 81 having a basically trapezoidal cross-section and includes mounting block 83, fastening strap 85 and ski slot 87 and ski pole openings 89 and 91. The ski poles are placed in openings 89 and 91 and the skis in slot 87 and these are held down by means of some type of fastening mechanism 93 which, in this case, is a VELCRO ®-type fastener with male-hook filamentary fastener members 95 and female-loop filamentary fastening members 97.

FIG. 9 shows basically the same type of ski holder shown above in FIG. 8 and is shown generally as ski holder 101 except that the mounting block 103 has a circular configuration instead of a trapezoidal configuration and, for purposes of eliminating weight, shows an optional cutout 105. In addition, two fastening members 107 and 109 are shown instead of a single fastening member. The ski slots 111 and optional ski pole openings 113 and 115 function in the same manner as the ski holder shown in FIG. 8.

Essentially ski holder such as the type shown in FIGS. 8 and 9 are screwed, rivited, bolted, heat sealed, looped or otherwise attached to a ski holder mounting means of the present invention and a plurality of these are used. Thus, two, three, four or even five or perhaps more could be used. In addition, the ski holders could alternatively be of the more conventional type having bolt down clamps or snaps or fasteners other than the VELCRO ®-type and still be within the purview of the invention.

Figure 10:
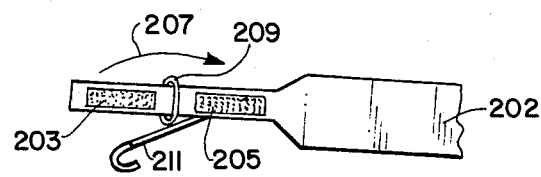
FIG. 10 illustrates an alternative fastening means for the vehicle mounting means of the type shown generally in FIG. 1.

FIG. 10 illustrates a partial top view of a preferred embodiment of the vehicle mounting means of the present invention removable ski rack, wherein the vehicle mounting means is shown generally as 202. Also shown in FIG. 10 are male and female VELCRO ® strips 203 and 205 which, as illustrated by the arrow 207, cooperate with one another in a fold over fashion to create a closed loop which holds plastic or metal adjustment ring 209. The loose end at VELCRO ® strip 203 may be passed through or otherwise strapped in conjunction with adjustment ring 209 and attached to VELCRO ® strip 205 as a mechanism for adjusting the length of vehicle mounting means 202. Also shown is clamp 211 which is used to affix vehicle mounting means 202 to the edge of a vehicle rooftop, door jam, or the like.

Figure 11:
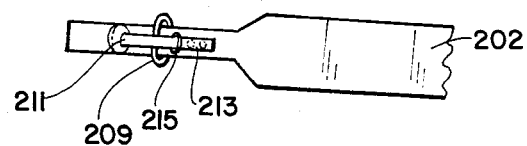
FIG. 11 is a bottom view of the vehicle mounting means shown in FIG. 10.

FIG. 11 shows the back side or bottom of vehicle mounting means 202 and includes adjustment ring 209 as shown. Also shown is clamp 211 and a smaller or thinner strap 213 with its own adjustment loop 215 which is also used for adjusting the exact location of clamp 211. As shown, thinner strap 213 is sewn to the back side of the end of vehicle mounting means 202.

Figure 12:
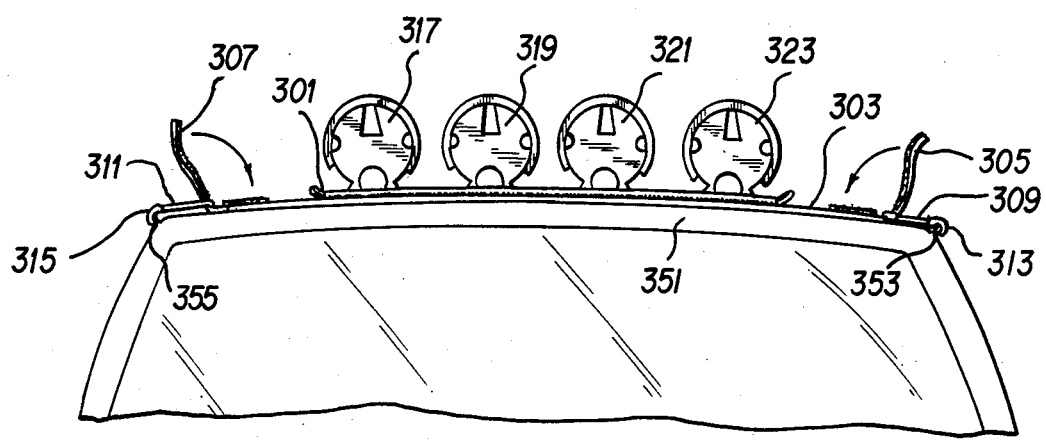
FIG. 12 is a front view of a roof portion of a vehicle and a ski rack of the present invention; and, FIG. 13 is a close-up frontal exploded view of a portion of a ski rack of the present invention showing details of a clamp which might be used in the present invention device.

FIG. 12 illustrates a front view of a present invention device including the rooftop of motor vehicle 351. In FIG. 12, vehicle mounting means 303 includes a VELCRO ® ends 305 and 307 along with clamps 309 and 311 having hooked ends 313 and 315 respectively which attach to motor vehicle 351's gutters 353 and 355 respectively. As shown, ends 305 and 307 may be pulled tightly and VELCRO ® sealed by being folded over as shown by the arrows in FIG. 12. Also shown in FIG. 12 is ski holder mounting means 301 with ski holders 317, 319, 321 and 323 permanently attached to ski holder mounting means 301. In this embodiment ski holder mounting means 301 is attached by VELCRO ® to vehicle mounting means 303 as shown.

Figure 13:
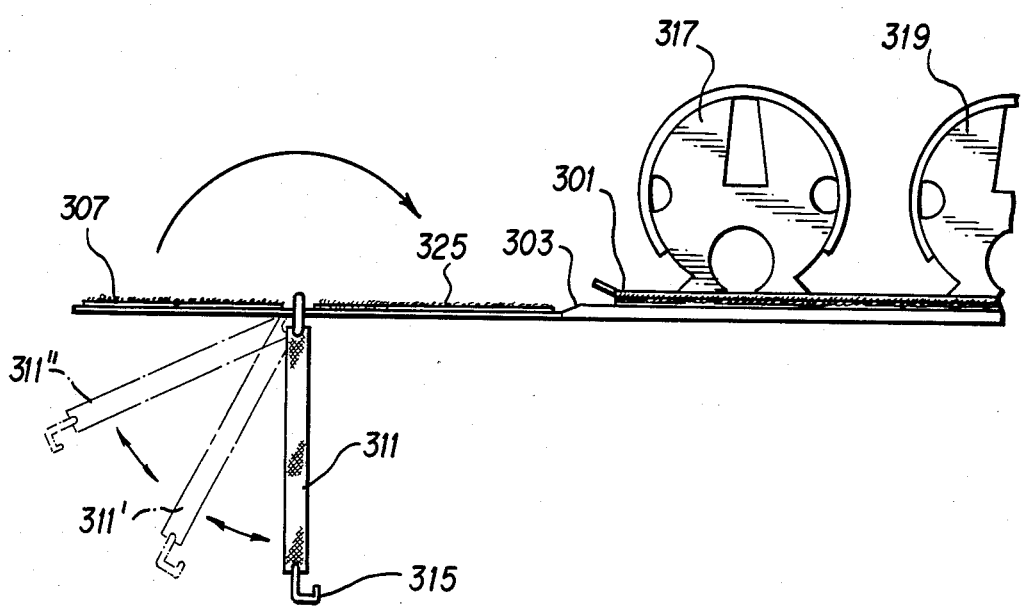

FIG. 13 illustrates a close-up frontal view of a portion of the present invention device shown in FIG. 12 and like parts are like numbered. As shown in FIG. 13, clamp 311 with hook 315 has the ability to be swung so as to be positioned in a vertical arrangement, or at some extended arrangement such as is shown at 311' and at 311". In this way, the clamp may be attached to numerous vehicles and may be tightened by end 307 and VELCRO ® sealed as shown by the arrow. In those instances where the motor vehicle has no rain gutter, the clamp 311 with hook 315 may simply be hooked into the top of a door window with the window down slightly so that hook 315 goes into the glass slot at the top of the door. The window may then be closed without difficulty and the present invention ski rack will be secured.

It can now be seen that the removable ski rack of the present invention is made up of a pair of vehicle mounting means, each of which includes a first strap of adequate length to substantially traverse the width of a motor vehicle and each vehicle mounting means includes roof fasteners on each end of a first strap to securely attach the vehicle mounting means to the vehicle. The vehicle mounting means includes a first set of male-hook female-loop type filamentary fastening members located on at least a portion of the top of the first strap. Also included in the ski rack of the present invention is a pair of ski holder mounting means, each of which includes a second strap having a second set of male-hook female-loop type filamentary fastening members located at least on a portion of the bottom of the second strap, this second set of filamentary type fastening members being of opposite gender to the first located on the top of the vehicle mounting means. The ski holder mounting mean is detachable affixed to the vehicle mounting means by the filamentary fastening members and the ski holder mounting means has a plurality of ski holders located on the top so that skis can be mounted by whatever locking mechanisms are included with the ski holders so a to detachably lock the skis into the ski holders. The ski holders may optionally include provisions for mounting skiing poles, although this is not critical as ski poles are typically shorter than skis and are often transported in trunks or within the vehicles themselves other than on the roofs. Ideally, the ski rack of the present invention has padding on the bottom of the vehicle mounting means so as to protect the finish of the vehicle. In addition, the present invention includes protector type means which are very similar to the ski holder mounting means but without an ski holders. Basically, the ski holder mounting means may be stripped off of the vehicle mounting means after one arrives at a ski lodge or ski area and this removed ski holder mounting means may be stored in the trunk or within the car. In other words, an important aspect of the present invention is that the ski holder portions themselves by virtue of the detachability of the ski holder mounting means and may be stored within the vehicle or the trunk to prevent theft, as well as to eliminate exposure to elements such as icing and this will allow for fewer problems after the user has completed his or her skiing. Last, it should be noted that the use of a protector to press over the vehicle mounting means will keep snow and ice off of the VELCRO ® which is located on the mounting means and this will be done without the need to remove the clamps of the strapping itself. Heretofore, tools or mechanical twisting forces or other difficult and/or time consuming steps were required to remove ski holders from roofs of vehicles to prevent theft, icing, etc. The present invention not only allows for substantial adjustment and contoring depending upon the particular vehicle with which the presen invention ski rack is being used but also enables the removal of the critical ski holder aspects while leaving the clamping and roof mounting means in place.

Obviously, numerous modifications and variations of the present invention are possible in light of the above teachings. It is therefore understood that within the scope of the appended claims, the invention may be practiced otherwise than as specifically described herein.

What is claimed is:

1. A removable ski rack for motor vehicles having two independently mounted systems, each system of which comprises:
   (a) a vehicle mounting means to mount the ski rack to the roof of a motor vehicle, which includes a first strap of adequate length to substantially traverse the width of a motor vehicle with a bottom surface adapted to overlie the roof of the motor vehicle, roof fasteners on each end of said first strap to securely attach the vehicle mounting means to the vehicle, and a first set of at least one of a male-hook or female-loop type filamentary fastening members located on at least a portion of the upper surface of said first strap;

(b) a ski holder mounting means, which includes a second strap having a second set of at least one of a male hook or female-loop type filamentary fastening members located on at least a portion of the bottom surface of said second strap, said second set being of opposite gender to said first set said ski holder mounting means being mounted on the upper surface of said second strap and overlying said second set of fastening members, and said first set of fastening members being directly opposite said second set of fastening members, said ski holder mounting means being detachably affixed to the vehicle mounting means by mating said fastening members; and, (c) a plurality of ski holders having bottom surfaces mounted directly on the upper surface of said ski holder mounting means, said ski holders having ski locking mechanisms to detachably lock skis into said ski holders.

2. The ski rack of claim 1 wherein said first strap and said second strap are semi-flexible and made of synthetic material.

3. The ski rack of claim 1 wherein said first strap and said second strap are flexible and made of woven fabric material.

4. The ski rack of claim 1 wherein said second strap has at least one end adapted to be hand held to facilitate detachment from said first strap.

5. The ski rack of claim 2 wherein said second strap has at least one end adapted to be hand held to facilitate detachment from said first strap.

6. The ski rack of claim 3 wherein said second strap has at least one end adapted to be hand held to facilitate detachment from said first strap.

7. The ski rack of claim 1 wherein said first strap includes padding on its bottom minimizing harm to the motor vehicle roof surface.

8. The ski rack of claim 1 wherein said ski holders include a solid portion cut to receive a pair of skis and wherein said locking mechanisms includes enclosing means, a first set of male-hook female-loop type filamentary fastening members located on said enclosing means and a second set of male-hook female-loop type filamentary fastening means located on said solid portion said first set and second set of filamentary fastening means being of opposite gender.

9. The ski rack of claim 8 wherein said solid portion is additionally cut to receive a pair of ski poles.

10. The ski rack of claim 8 wherein said solid portion is semi-circular in cross-section.

11. The ski rack of claim 8 wherein said solid portion is trapezoidal in cross-section.

12. The ski rack of claim 9 wherein said solid portion is semi-circular in cross-section.

13. The ski rack of claim 9 wherein said solid portion is trapezoidal in cross-section.

14. The ski rack of claim 1 wherein said roof fasteners are clamps adapted to attached to motor vehicle roof gutters and said first strap additionally includes length shortening means to enable tightening of said first strap atop a motor vehicle roof.

15. The ski rack of claim 1 wherein said roof fasteners are clamps adapted to attach to motor vehicle roof gutters and are movable and lockably attached to said first strap to enable tightening of said first strap atop a motor vehicle roof.

16. The ski rack of claim 1 wherein said roof fasteners are clamps adapted to attach to motor vehicle door members and said first strap additonally includes length shortening means to enable tightening of said first strap atop a motor vehicle roof.

17. The ski rack of claim 1 wherein said roof fasteners are clamps adapted to attach to motor vehicle door members and are movably and lockably attached to said first strap to enable tightening of said first strap atop a motor vehicle roof.

18. The ski rack of claim 1, in which each system further comprises:

(d) a protector means, which includes a third strap having a set of male-hook female-loop type filamentary fastening members located at least a portion of the bottom of said third strap, which set of filamentary fastening members corresponds to the filamentary fastening members of the ski holder mounting means.

* * * * *